Figure 1:
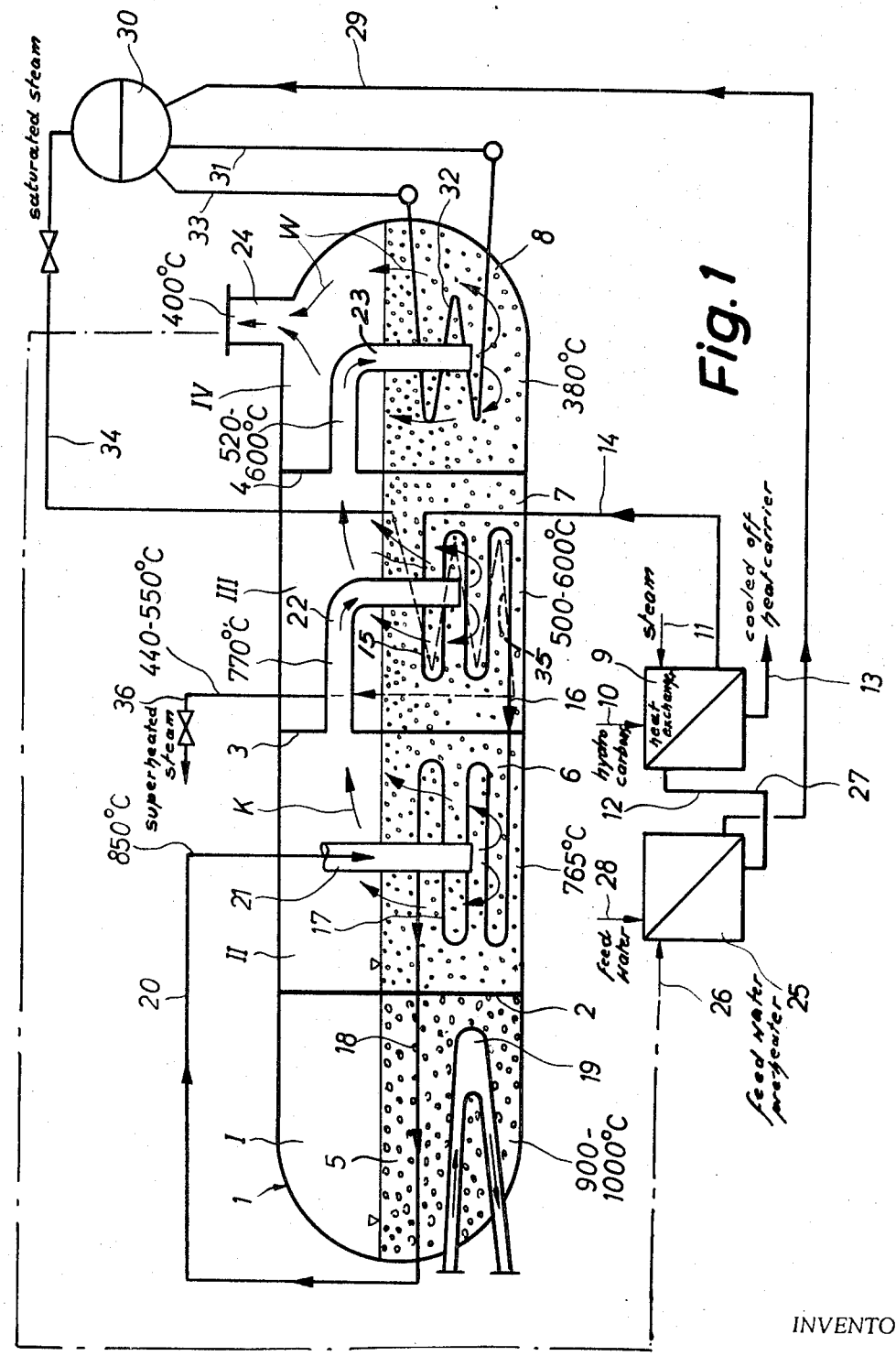

United States Patent
Vollhardt

[15] 3,658,498
[45] Apr. 25, 1972

[54] METHOD AND APPARATUS FOR PRODUCING ETHYLENE AND SYNTHESIS GAS BY THERMAL CRACKING

[72] Inventor: Frohmut Vollhardt, Siegen, Germany

[73] Assignee: Siegener Aktiengesellschaft Geisweid, Huttental-Geisweid, Germany

[22] Filed: May 28, 1970

[21] Appl. No.: 41,264

[30] Foreign Application Priority Data

June 3, 1969 Germany..................P 19 28 091.2

[52] U.S. Cl. ................................48/92, 48/211, 260/677 R
[51] Int. Cl. ...........................................C01b 2/00, C10g 9/34
[58] Field of Search.......................48/214, 211, 94, 92, 105; 260/677, 679, 680; 252/373

[56] References Cited

UNITED STATES PATENTS

| | | |
|---|---|---|
| 701,186 | 5/1902 | Faulkner..................................48/94 |
| 701,806 | 6/1902 | Faulkner..................................48/94 |
| 2,485,875 | 10/1949 | Gorin et al. ..........................48/214 X |
| 2,792,437 | 5/1957 | Goins et al. ..........................48/214 X |
| 3,192,018 | 6/1965 | Minami...............................23/288.35 |
| 3,407,789 | 10/1968 | Hallee et al. .......................48/211 UX |
| 3,480,689 | 11/1969 | Bohrer..................................48/92 X |

Primary Examiner—Morris O. Wolk
Assistant Examiner—R. E. Serwin
Attorney—Walter Becker

[57] ABSTRACT

Method of and apparatus for producing ethylene and synthesis gas by thermal cracking, according to which at least one component of the cracked gas is used for preheating the gas to be cracked.

8 Claims, 2 Drawing Figures

Patented April 25, 1972

3,658,498

2 Sheets-Sheet 1

INVENTOR.
Frohmut Vollhardt
BY
Walter Becker

METHOD AND APPARATUS FOR PRODUCING ETHYLENE AND SYNTHESIS GAS BY THERMAL CRACKING

The present invention relates to a method of and apparatus for producing ethylene or synthesis gas by thermal cracking.

It is known to produce ethylene or in changed form also synthesis gas by thermal cracking in gas-heated pipe furnaces. This known method has a high fuel consumption inherent thereto, and there exists the possibility that portions of the pipes are locally overheated in a non-controllable manner because the radiation, even when providing a plurality of individual burners, cannot be kept uniform over the entire tube surface area. Furthermore, the heretofore known methods for producing ethylene gas or synthesis gas are uneconomical, inasmuch as the ethylene or synthesis gas leaves the cracking furnace at temperatures of from 500° to 600° C. and has to be cooled in waste heat installations to approximately 200° C.

It is, therefore, an object of the present invention to provide a method of the above mentioned general type which will be considerably more economical than heretofore known methods of the type involved.

It is another object of this invention to provide an improved apparatus for producing ethylene gas and synthesis gas by thermal cracking.

These and other objects and advantages of the invention will appear more clearly from the following specification in connection with the accompanying drawings, in which:

FIG. 1 illustrates an apparatus according to the invention, in which a gas burner is employed as foreign heating means.

Figure 2:
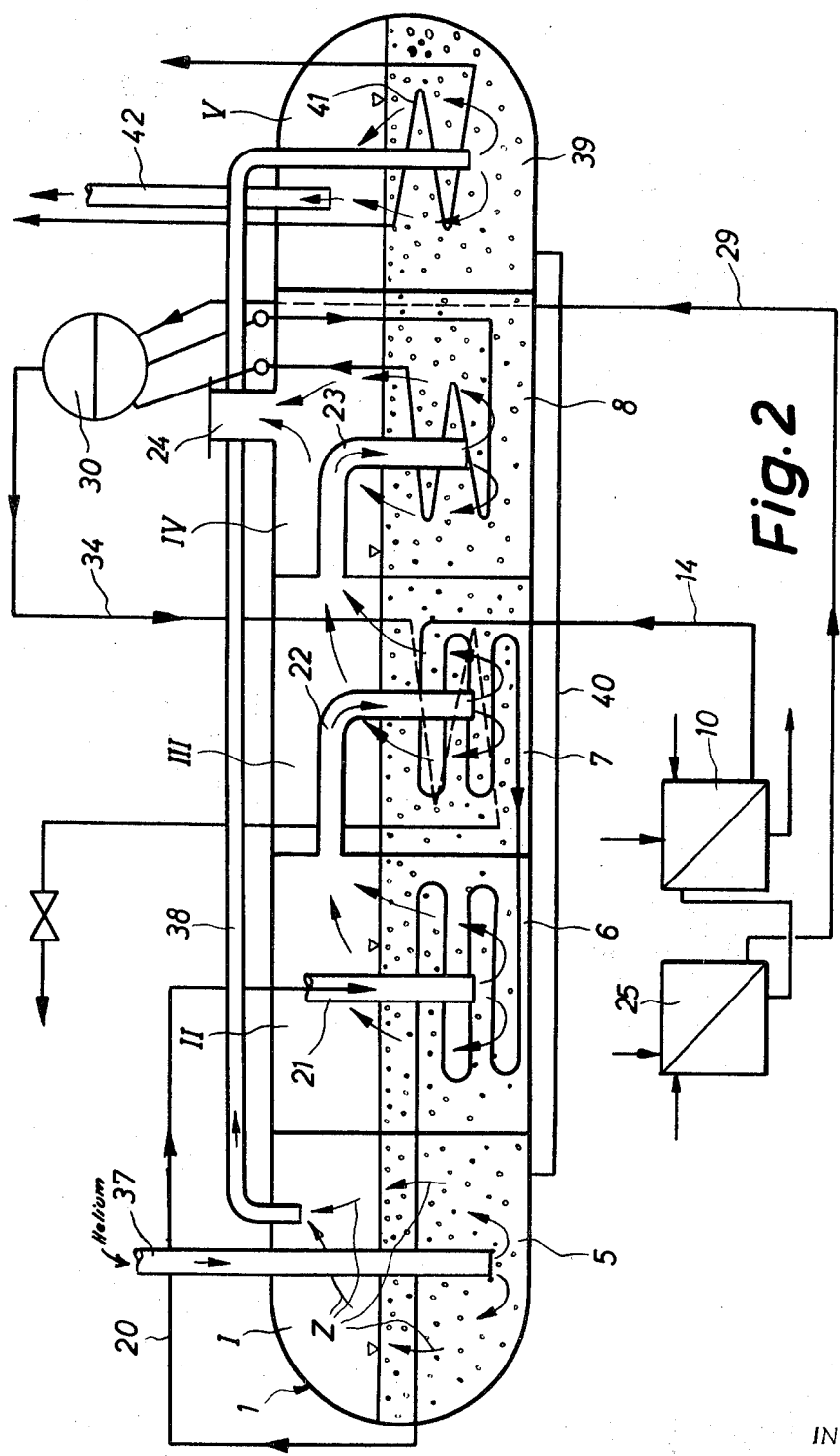

FIG. 2 diagrammatically illustrates an apparatus according to the invention, in which the foreign heat is introduced into the cracking furnace in the form of a rare or inert gas.

The method according to the present invention for producing ethylene gas and synthesis gas by thermal cracking is characterized primarily in that the cracking gas is, prior to the cracking, preheated by hot ethylene gas or synthesis gas respectively. As a result thereof, a considerable portion of the heat content of the ethylene gas or the synthesis gas is made use of for heating the cracking gas so that only a rather small amount of heating energy is necessary to heat the cracking gas to cracking temperature which means up to approximately from 900° to 950° C., whereas a pre-heating of the cracking gas up to from 700° to 750° C. can be effected by the pre-heated ethylene gas or synthesis gas itself. The path over which the hot ethylene gas or the synthesis gas has to move as pre-heated medium is short, so that no long conduits are necessary for feeding a medium (fuel or waste heat) to the cracking gas for pre-heating the same.

The additional heating for producing the cracking operation may be effected either in a known manner by gas burners, but it is more favorable to effect this additional heating by means of inert or rare gases, especially helium from a reactor.

According to a further development of the invention, the cracking gas may be pre-heated and cracked in metal baths. To this end, the ethylene gas or synthesis gas is passed through a metal bath provided with cracking gas pipes.

According to a further method of the invention, the ethylene gas or the synthesis gas is passed in a plurality of stages through a metal bath provided with cracking pipes.

The ethylene gas or the synthesis gas may, following the pre-heating of the cracking gas, be passed through one or more stage steam generators or exchangers so that the heat inherent to the ethylene gas or the synthesis gas will be exploited to a major extent.

Referring now to the drawings in detail, the cracking furnace 1 is subdivided by partitions 2, 3, 4, into four chambers or stages I, II, III, IV. Into each of said chambers there is introduced a liquid metal bath, preferably a lead bath 5, 6, 7, 8 respectively, said metal baths, as will be explained further below, respectively being of different temperatures.

From a heat exchanger 9 into which the hydrocarbons are introduced at 10, while steam is introduced at 11, and the heat carrier is introduced at 12, while at 13 the cooled-off heat carrier can escape, the hydrocarbon-steam-mixture is passed through a conduit 14 to a heat exchanger 15 which is surrounded by the liquid metal of bath 7 the temperature of which is from 500° to 600° C.

The hydrogen-carbon-steam mixture which leaves the heat exchanger 9 with a temperature of approximately 350° C. and through a conduit 14 passes to the heat exchanger 15 is preheated in the latter and through conduit 16 passes to a heat exchanger 17 which immerses in the bath 6 having a temperature of approximately 765° C. The cracked gas composed of hydrocarbon and steam passes through conduit 19 into the bath 5 having a temperature of 900° to 1000° C., the cracked gas being cracked in bath 5.

The liquid metal bath 5 is heated by means of the gases of a non-illustrated gas burner, which gases are conveyed in line 19 through the metal bath 5.

The hot ethylene or synthesis gas which has been cracked in bath 5 is passed through conduit 20 at a temperature of 850° C. into the immersion pipe 21 of the chamber II where it bubbles and leaves the chamber II in the direction of the arrow K at a temperature of 770° C. through overflow pipe 22. Pipe 22 immerses in the bath 7 which has been heated at a temperature of from 500° to 600° C. and through which the ethylene or synthesis gas bubbles. From chamber III, the gas will at a temperature of from 520° to 600° C. pass into the overflow pipe 23. Bath 8 is heated to a temperature of 380° C. The ethylene gas or the synthesis gas finally moves in the direction of the arrows W through the connection 24 at a temperature of approximately 400° C. to a further unit where it can give off its resilient heat, for instance, in a feed water preheater 25 where it can be passed through conduit 26 and/or conduit 27 into the heat exchanger 9 and from there through conduit 13 to a place of consumption. The feed water is conveyed into the heat exchanger 25 through conduit 28.

Instead of conveying the ethylene gas or the synthesis gas from the connection 24 through the feed water preheater 25 or the heat exchanger 9, the heat content of the ethylene gas or the synthesis gas may, of course, also be used for other purposes.

The feed water preheated in the feed water preheater 25 passes through conduit 29 to the drum 30 from where it is conveyed through a conduit 31 to a heat exchanger 32 in the chamber or stage IV and from there it is passed through a conduit 33 again to the drum 30. The generated saturated steam may, through conduit 34, be conveyed to the superheater 35 of the chamber or stage III from where the superheated steam is withdrawn at a temperature of from 400° to 550° C. through conduit 36.

Instead of feeding the foreign heating means through gas pipes 19 in conformity with FIG. 1, it is also possible according to FIG. 2 to provide an immersion pipe 37 for the helium of a core reactor through which the bath 5 bubbles in the direction of the arrows Z and through conduit 38 is passed to a further chamber or stage V of the cracking furnace 1. In this chamber or stage, the metal bath, preferably a lead bath has a temperature of from 380° to 400° C. so that on the basis of the high partial pressure in the chamber or stage I, the lead steam carried away by the helium passes into the bath 39 of the chamber or stage 5 where it can condensate. The thus obtained excess in lead of the bath 39, with regard to the bath, may be compensated for through conduit 40. Otherwise the structure of the furnace illustrated in FIG. 2 corresponds to that of FIG. 1.

It is, of course, to be understood that the present invention is, by no means, limited to the particular constructions shown in the drawings, but also comprises any modifications within the scope of the appended claims.

What I claim is:

1. A method of producing ethylene gas and synthesis gas by thermal cracking of a gas to be cracked and in which, prior to cracking, the gas to be cracked is preheated by way of the ethylene gas and synthesis gas in heat transfer relation to the gas to be cracked, which includes the steps of: preparing a plurality of standing hot metal baths of respectively progressively increasing temperature up to a higher temperature of predetermined cracking temperature value whereby in heat exchange with said gas to be cracked there is brought about a thermal cracking of said gas, passing the gas to be cracked in heat exchange with said baths in the direction from the lowest to the highest temperature bath while effecting the cracking of the gas to be cracked in heat exchange with that one of said baths which has the highest temperature, and conveying at least one of the components of the cracked gas through said standing baths in a direction inverse to the direction of flow of the gas to be cracked whereby the gas to be cracked is pre-heated by at least one component of the cracked gas.

2. A method according to claim 1, which includes the step of additionally supplying heat from the outside to that metal bath which has the highest temperature to bring the same up and maintain the same at at least cracking temperature of the gas to be cracked.

3. A method according to claim 2, in which the additionally supplied heat is heat energy gas from burner means.

4. A method according to claim 2, in which the additionally supplied heat is incorporated in helium gas from a core reactor.

5. An apparatus for producing ethylene gas and synthesis gas by thermal cracking in which a hydrocarbon steam mixture is pre-heated by way of cracked gas, which includes: a plurality of chamber means including pre-heating chamber means and cracking chamber means and adapted respectively to receive and contain standing metal baths of progressively increasing temperatures, conduit means adapted to be connected to a source of the hydrocarbon steam mixture and leading into and through at least one of said pre-heating chamber means into and through said cracking chamber means, heat exchanger means interposed in said conduit means and located in said pre-heating chamber means, additional heat conveying means extending into said cracking chamber means for conveying additional heat thereto to increase the temperature in said cracking chamber means to cracking temperature of the gas to be cracked, and conduit means leading from said cracking chamber means successively to the next preceding pre-heating chamber means to heat the same by at least one component of the cracked gas.

6. An apparatus according to claim 5, in which said heat exchanger means include cracked gas heat exchanger means.

7. An apparatus according to claim 5, in which said heat exchanger means include water-steam heat exchanger means adapted to be connected with a source of water-steam.

8. An apparatus according to claim 5, which includes conduit means for conveying helium from a nuclear core reactor to said cracking chamber means, additional chamber means and conduit means leading from said cracking chamber means into said additional chamber means to convey thereto metal vapors carried along by said helium gas.

* * * * *